Feb. 16, 1965  H. J. EHRINGER  3,169,861

METHOD FOR MAKING WELDING ELECTRODES

Filed Aug. 16, 1961

INVENTOR.
HERMANN J. EHRINGER.
BY
*W. D. Palmer*
ATTORNEY.

United States Patent Office 3,169,861
Patented Feb. 16, 1965

3,169,861
METHOD FOR MAKING WELDING ELECTRODES
Hermann J. Ehringer, West Orange, N.J., assignor to Westinghouse Electric Corporation, East Pittsburgh, Pa., a corporation of Pennsylvania
Filed Aug. 16, 1961, Ser. No. 131,812
12 Claims. (Cl. 75—206)

This invention relates to elongated tungsten members and, more particularly, to a method for making such members.

Tungsten welding electrodes are well known and are used to weld stainless steel and other relatively hard materials. In order to facilitate striking and maintaining the arc, it is common practice to incorporate into the welding electrode a small amount of refractory metal oxide which has an electron emissivity considerably greater than that of substantially pure tungsten. Such refractory metal oxides are thoria, ceria, zirconia, hafnia, titania and yttria, for example, and other similar metallic oxides have been used. These additive metallic oxides are evenly dispersed throughout the tungsten in a predetermined concentration, such as approximately 2% by weight of the tungsten.

This addition of the metallic oxides creates a certain amount of impurity in the weld and this impairs to some degree the quality of the resulting weld. In addition, during the welding operation the tip of the electrode does not form a desirable ball of tungsten to the degree that is experienced with a welding electrode which is formed of substantially pure tungsten. In spite of these disadvantages, however, the advantages of improved electron emissivity have justified the use of the indicated additive metallic oxides.

As indicated hereinbefore, the additive metallic oxides of the prior art are substantially evenly dispersed throughout the welding electrode. In forming such a welding electrode in accordance with known practices, the tungsten is first refined from the ore. The metallic oxide, such as thorium oxide, is normally added as thorium nitrate during the refining when the tungsten ore has been converted to the tungstic acid or oxide form. Thereafter the tungstic acid or oxide is converted to powdered tungsten and the metallic additive compound, such as thorium nitrate, is converted to the oxide. The tungsten powder containing the additive thorium oxide is then pressed into a self-sustaining compact, presintered in a hydrogen furnace, and thereafter electrically sintered with a self-resistance sintering technique. The sintered ingot is then swaged to that diameter desired for the finished electrode.

It is the general object of this invention to provide a method for forming an elongated member of heterogeneous composition varying from substantially pure tungsten to tungsten which has added thereto a predetermined percentage of refractory metallic oxide.

The aforesaid object of the invention, and other objects which will become apparent as the description proceeds, are achieved by providing an improved method for forming an elongated member wherein tungsten metal powder is first compressed into a compact. Thereafter a solution of metallic salt is applied to the compact as a longitudinally disposed stripe. The compact is then conventionally sintered and swaged into greatly elongated form, such as that of a welding electrode.

For a better understanding of the invention, reference should be had to the accompanying drawings wherein.

Although the principles of the present invention are broadly applicable to any elongated tungsten member having refractory metal oxides added thereto, such as electrodes for discharge devices, the present invention has particular utility with respect to tungsten welding electrodes and hence it has been so illustrated and will be so described.

Figure 1:
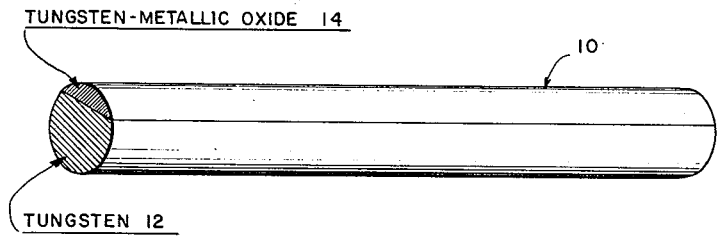
FIG. 1 is a perspective view of a welding electrode fabricated in accordance with the present invention, one end of which electrode is shown in section.

With specific reference to the form of the invention illustrated in the drawings, the welding electrode 10, as shown in FIG. 1, has a generally circular cross-section, a diameter varying from 40 to 156 mils and a length of about 7 inches. The electrode 10 has a heterogeneous composition with a substantial portion formed of substantially pure tungsten, as indicated by the numeral 12 in FIG. 1. The remaining portion of the welding electrode is formed as a longitudinally disposed stripe, as indicated by the numeral 14 in FIG. 1. The stripe portion 14 preferably is formed of a mixture of tungsten and thorium dioxide (thoria), wherein the tungsten desirably comprises from 96% to 99.5% by weight of the stripe and the thoria desirably comprises from .4% to 0.5% by weight of the stripe. The total thoria in the welding electrode is desirably present in amount of from 0.1% to 1.5% by weight of the welding electrode. For best results, the thoria in the stripe portion 14 should comprise from 1% to 2.5% by weight of the stripe portion and from 0.5% to 0.8% by weight of the welding electrode 10. As a specific example, the stripe portion 14 occupies 25% of the area of any cross section taken perpendicular to the elongated axis of the electrode 10 and the thoria contained in this stripe portion constitutes 2% by weight of the stripe 14.

The performance of the present welding electrode 10 is considerably improved over the welding electrodes of the prior art wherein 2% by weight of thoria, for example, is evenly dispersed throughout the entire electrode. The portion 12 of the present electrode, which is formed of substantially pure tungsten, will form a ball of tungsten during the welding operation and this facilitates making the best possible weld. The thoria contained in the stripe 14 will provide increased electron emissivity which will facilitate both striking and maintaining the arc. In addition, for the specific example as given, only about 0.5% by weight of the total electrode is formed of thoria so that the amount of thoria impurity which is introduced into the resulting weld is minimized.

Figure 2:
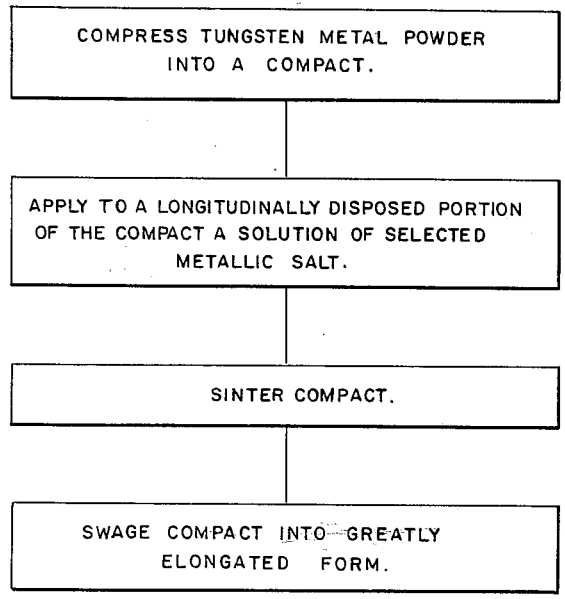
FIG. 2 is a flow diagram setting forth a preferred method for fabricating the elongated tungsten member of the present invention.

As a specific example for preparing the present welding electrode, reference is made to the flow-diagram shown in FIG. 2. Tungsten metal powder is first prepared from the ore in accordance with conventional processing techniques. The resulting very finely divided tungsten metal powder is compacted into an ingot. By way of detail, 2050 grams of tungsten metal powder are pressed into an ingot having dimensions of 0.725 inch by 0.655 inch by 24 inches, using a pressure of 17 tons per square inch. This compact has sufficient strength to facilitate its being handled and a solution of thorium nitrate can be applied to this compact, in accordance with the present invention and as explained in detail hereinafter. From the standpoint of production handling, however, it is first desirable to presinter the compact in order to improve its stability to facilitate handling. To accomplish such presintering, the compact is heated in a hydrogen atmosphere at a predetermined temperature, such as 1000° C., for a predetermined time, such as 20 minutes, in order to provide an incipient sintering of the compacted tungsten particles. This enables the compact to be readily handled.

After presintering, a solution of thorium compound, such as thorium nitrate which is convertible to the oxide on heating, is added as a longitudinally disposed stripe to the compact. This stripe occupies a predetermined limited portion of any section taken perpendicular to the length dimension of the compact. This liquid solution of thorium nitrate is applied in predetermined amount and contains a predetermined concentration of thorium nitrate, for example, to leave residual thoria in the amount as specified hereinbefore.

As one method for applying the thorium nitrate to the presintered compact, the compact can be passed under a burette at a predetermined rate while a solution of thorium nitrate is flowed onto the compact at a predetermined rate. It is preferred, however, partially to immerse the compact to a predetermined depth in a liquid solution which contains a predetermined concentration of thorium nitrate, with the axial dimension of the compact in a substantially horizontal orientation. The compact is maintained in such solution until a predetermined amount of such solution has been sorbed into the compact. As a specific example, the foregoing compact is immersed to a depth of $\frac{1}{16}$ inch in an aqueous solution of thorium nitrate containing an equivalent weight of thorium oxide in amount of 0.589 gram of thorium oxide per cubic centimeter of solution. The compact is maintained in contact with such solution until 20 cc. of the solution are sorbed into the compact. Thereafter the compact is removed and clamped between sintering electrodes for conventional self-resistance sintering in a non-oxidizing atmosphere. The preferred sintering atmosphere is hydrogen. For a specific sintering schedule, reference is made to copending application S.N. 683,809, filed September 13, 1957, and owned by the present assignee, modifying this sintering schedule to hold a maximum sintering current of 80.7% of fusion ampere for a total period of 25 minutes. The sintered electrode is then swaged in accordance with conventional practices to that diameter desired for the welding electrode. For a specific example of a suitable swaging schedule, reference is made to the aforementioned copending application S.N. 683,809, filed September 13, 1957.

Other known refractory metal oxides which have an electron emissivity considerably greater than that of tungsten can be substituted for the specific preferred thoria, with the total amount of refractory metal oxide which is included in the formed stripe desirably maintained within the weight percentage limitations as specified for the thoria additive. Examples of such other known refractory metal oxides which can be used are ceria, zirconia, hafnia, titania and yttria. These other oxides can be applied to the tungsten compact as the nitrate, in accordance with the thorium nitrate specific example outlined hereinbefore. Alternatively, these other refractory metal oxides can be mixed or different oxides can be applied as individual stripes to different portions of the compact, in order to obtain different degrees of emissivity for different portions of the resulting electrode. As a specific example, thorium nitrate and cerium nitrate can be mixed in equivalent molar percentages and applied to the electrode. Alternatively, any of the other indicated refractory metal oxides can be mixed in any proportions and applied to the compact as the nitrates, for example, either as a stripe or as a plurality of stripes.

The present tungsten members can be fabricated by methods other than those disclosed, such as by initially forming the compact with a heterogeneous composition, thereafter sintering and swaging. In addition, metallic salts other than the nitrates can be used when addiing the solution of metallic salt to the formed compact. The presintering if used, the sintering schedule and the swaging schedule are also subject to considerable variation.

It will be recognized that the objects of the invention have been achieved by providing a method for forming an elongated member of heterogeneous composition which varies from substantially pure tungsten to tungsten which has added thereto a predetermined percentage of refractory metal oxide.

While best examples have been illustrated and described hereinbefore, it is to be particularly understood that the invention is not limited thereto or thereby.

I claim:

1. The method of forming an elongated member principally comprising tungsten and having a cross section of heterogeneous composition which varies from substantially pure tungsten to tungsten having added thereto a predetermined proportion of selected additive refractory metallic oxide having an electron emissivity which is considerably greater than the electron emissivity of substantially pure tungsten, which method comprises: compressing tungsten metal powder into a porous self-sustaining elongated compact, sorbing into said compact as a longitudinally disposed stripe which occupies a predetermined limited portion of any section taken perpendicular to the length dimension of said compact, a liquid solution containing a predetermined concentration of metallic salt which is convertible to said refractory metallic oxide on heating; sintering said compact in a non-oxidizing atmosphere to cause the particles comprising said compact to coalesce and form a sintered ingot; and mechanically working said ingot into greatly elongated form.

2. The method of forming an elongated member principally comprising tungsten and having a cross section of heterogeneous composition which varies from substantially pure tungsten to tungsten having added thereto a predetermined proportion of selected additive refractory metallic oxide having an electron emissivity which is considerably greater than the electron emissivity of substantially pure tungsten, which method comprises: compressing tungsten metal powder into a porous self-sustaining elongated compact; heating said compact in a hydrogen atmosphere at a predetermined temperature and for a predetermined limited time sufficient to provide an incipient sintering of the compacted particles comprising said compact; sorbing into said compact as a longitudinally disposed stripe which occupies a predetermined limited portion of any section taken perpendicular to the length dimension of said compact, a liquid solution containing a predetermined concentration of metallic salt which is convertible to said refractory metallic oxide on heating; sintering said compact in a hydrogen atmosphere to cause the particles comprising said compact to coalesce and form a sintered ingot; and mechanically working said ingot into greatly elongated form.

3. The method of forming an elongated member principally comprising tungsten and having a cross section of heterogeneous composition which varies from substantially pure tungsten to tungsten having added thereto a predetermined proportion of selected additive refractory metallic oxide having an electron emissivity which is considerably greater than the electron emissivity of substantially pure tungsten, which method comprises: compressing tungsten metal powder into a porous self-sustaining elongated compact, partially immersing said compact to a predetermined depth in a liquid solution containing a predetermined concentration of a metallic salt which is convertible to said refractory metallic oxide on heating with the axial dimension of said compact in a substantially horizontal orientation, maintaining said compact in such solution until a predetermined amount of such solution has been sorbed into only a limited cross-sectional portion of said compact, sintering said compact in a hydrogen atmosphere to cause the particles comprising said compact to coalesce and form a sintered ingot, and mechanically working said ingot into greatly elongated form.

4. The method of forming an elongated member principally comprising tungsten and having a cross section of heterogeneous composition which varies from substantially pure tungsten to tungsten having added thereto a predetermined proportion of additive refractory metallic oxide, which method comprises: compressing tungsten metal powder into a porous self-sustaining elongated compact; partially immersing said compact to a predetermined depth in a liquid solution containing a predetermined concentration of salt of at least one metal of the group consisting of thorium, cerium, zirconium, hafnium, titanium and yttrium and which salt will convert to said oxide on heating with the axial dimension of said compact in a substantially horizontal orientation; maintaining said compact in such solution until a predetermined amount of such solution has been sorbed into only a limited cross-sectional portion of said compact; sintering said compact in a hydrogen atmosphere to cause the particles comprising said compact to coalesce and form a sintered ingot; and mechanically working said ingot into greatly elongated form.

5. The method of forming an elongated member principally comprising tungsten and having a cross section of heterogeneous composition which varies from substantially pure tungsten to tungsten having added thereto a predetermined proportion of selected additive refractory metallic oxide, which method comprises:

(a) forming a tungsten compact from finely divided tungsten powder;

(b) partially immersing said formed compact to a predetermined depth in a liquid solution containing a predetermined concentration of metallic salt which will convert to said oxide on heating, with the axial dimension of said partially immersed compact in a substantially horizontal orientation, and with the metallic constituent of said metallic salt selected from at least one metal of the group consisting of thorium, cerium, zirconium, hafnium, titanium and yttrium;

(c) maintaining said compact in said solution until said solution has been sorbed into only a limited longitudinal portion of said compact, with the total concentration of said salt in the solution-sorbed portion of said compact, expressed as metallic oxide, being from 0.5% to 4% by weight of the tungsten in such solution-sorbed portion of said compact, and with the total concentration of said salt in said sorbed solution, expressed as equivalent metallic oxide, constituting from 0.1% to 1.5% by weight of the total tungsten in said compact;

(d) sintering said compact in a non-oxidizing atomsphere to cause the particles comprising said compact to coalesce and form a sintered ingot; and (e) mechanically working said ingot into greatly elongated form.

6. The method as specified in claim 5, wherein said metallic salt is the nitrate.

7. The method as specified in claim 5, wherein said non-oxidizing atmosphere is a hydrogen atmosphere.

8. The method as specified in claim 5, wherein prior to immersion in said solution, said compact is heated in a hydrogen atmosphere at a sufficient temperature and for a sufficient time to provide an incipient sintering of the particles comprising said compact.

9. The method of forming an elongated member principally comprising tungsten and having a cross section of heterogeneous composition which varies from substantially pure tungsten to tungsten having added thereto a predetermined proportion of selected additive refractory metallic oxide which method comprises:

(a) forming a tungsten compact from finely divided tungsten powder;

(b) partially immersing said formed compact to a predetermined depth in a liquid solution containing a predetermined concentration of metallic salt which will convert to said oxide on heating, with the axial dimension of said partially immersed compact in a substantially horizontal orientation, and with the metallic constituent of said metallic salt selected from at least one metal of the group consisting of thorium, cerium, zirconium, hafnium, titanium and yttrium;

(c) maintaining said compact in said solution until said solution has been sorbed into only a limited longitudinal portion of said compact, with the total concentration of said salt in the solution-sorbed portion of said compact, expressed as metallic oxide, being from 1% to 2.5% by weight of the tungsten in such solution-sorbed portion of said compact, and with the total concentration of said salt in said sorbed solution, expressed as equivalent metallic oxide, constituting from 0.5% to 0.8% by weight of the total tungsten in said compact;

(d) sintering said compact in a non-oxidizing atmosphere to cause the particles comprising said compact to coalesce and form a sintered ingot; and (e) mechanically working said ingot into greatly elongated form.

10. The method as specified in claim 9, wherein said metallic salt is the nitrate.

11. The method as specified in claim 9, wherein said non-oxidizing atmosphere is a hydrogen atmosphere.

12. The method as specified in claim 9, wherein prior to immersion in said solution, said compact is heated in a hydrogen atmosphere at a sufficient temperature and for a sufficient time to provide an incipient sintering of the particles comprising said compact.

References Cited in the file of this patent
UNITED STATES PATENTS

| | | |
|---|---|---|
| 1,822,720 | Wyman | Sept. 8, 1931 |
| 2,586,516 | Cobine | Feb. 19, 1952 |
| 2,640,135 | Cobine | May 26, 1953 |
| 2,825,703 | Conant | Mar. 4, 1958 |
| 3,090,703 | Gruber et al. | May 21, 1963 |